United States Patent

Goto et al.

[11] Patent Number: 5,353,375
[45] Date of Patent: Oct. 4, 1994

[54] DIGITAL AUDIO SIGNAL CODING METHOD THROUGH ALLOCATION OF QUANTIZATION BITS TO SUB-BAND SAMPLES SPLIT FROM THE AUDIO SIGNAL

[75] Inventors: Michiyo Goto, Osaka; Yoshinori Matsui, Katano, both of Japan

[73] Assignee: Matsushita Electric Industrial Co., Ltd., Kadoma, Japan

[21] Appl. No.: 922,179

[22] Filed: Jul. 30, 1992

[30] Foreign Application Priority Data

Jul. 31, 1991 [JP] Japan .................. 3-191602
Dec. 3, 1991 [JP] Japan .................. 3-318962

[51] Int. Cl.$^5$ .................................................. G10L 9/00
[52] U.S. Cl. ............................. 395/2.38; 395/2.39
[58] Field of Search .............. 395/2, 2.38, 2.39; 381/29–51

[56] References Cited

U.S. PATENT DOCUMENTS

| | | | |
|---|---|---|---|
| 4,622,680 | 11/1986 | Zinser | 381/31 X |
| 4,941,152 | 7/1990 | Medan | 381/31 X |
| 4,956,871 | 9/1990 | Swaminathan | 381/31 |
| 4,972,484 | 11/1990 | Theile et al. | 381/37 |

FOREIGN PATENT DOCUMENTS 0059294 9/1982 European Pat. Off. .
0193143 9/1986 European Pat. Off. .

OTHER PUBLICATIONS

Y. Mahieux and J. P. Petit, "Transform Coding of Audio Signals at 64 KBIT/S", IEEE Global Telecommunications Conference, vol. 1, pp. 518–522 (Dec. 1990).

Primary Examiner—Allen R. MacDonald
Assistant Examiner—Michelle Doerrler
Attorney, Agent, or Firm—Ratner & Prestia

[57] ABSTRACT

Disclosed is an invention concerning a quantization bit number allocating section for sub-band coding, wherein data important for human auditory sense are efficiently coded within a limited coding bit capacity to provide a high-quality digital audio signal. The quantization bit number allocating section comprises a level calculating section, a logarithm calculating section, an index calculating section, a quantization bit number calculating section, a logarithm weighting table, and a sub-band weighting table, wherein the quantization bit number is determined every prescribed time according to human auditory sense and the characteristic of an input digital audio signal.

14 Claims, 5 Drawing Sheets

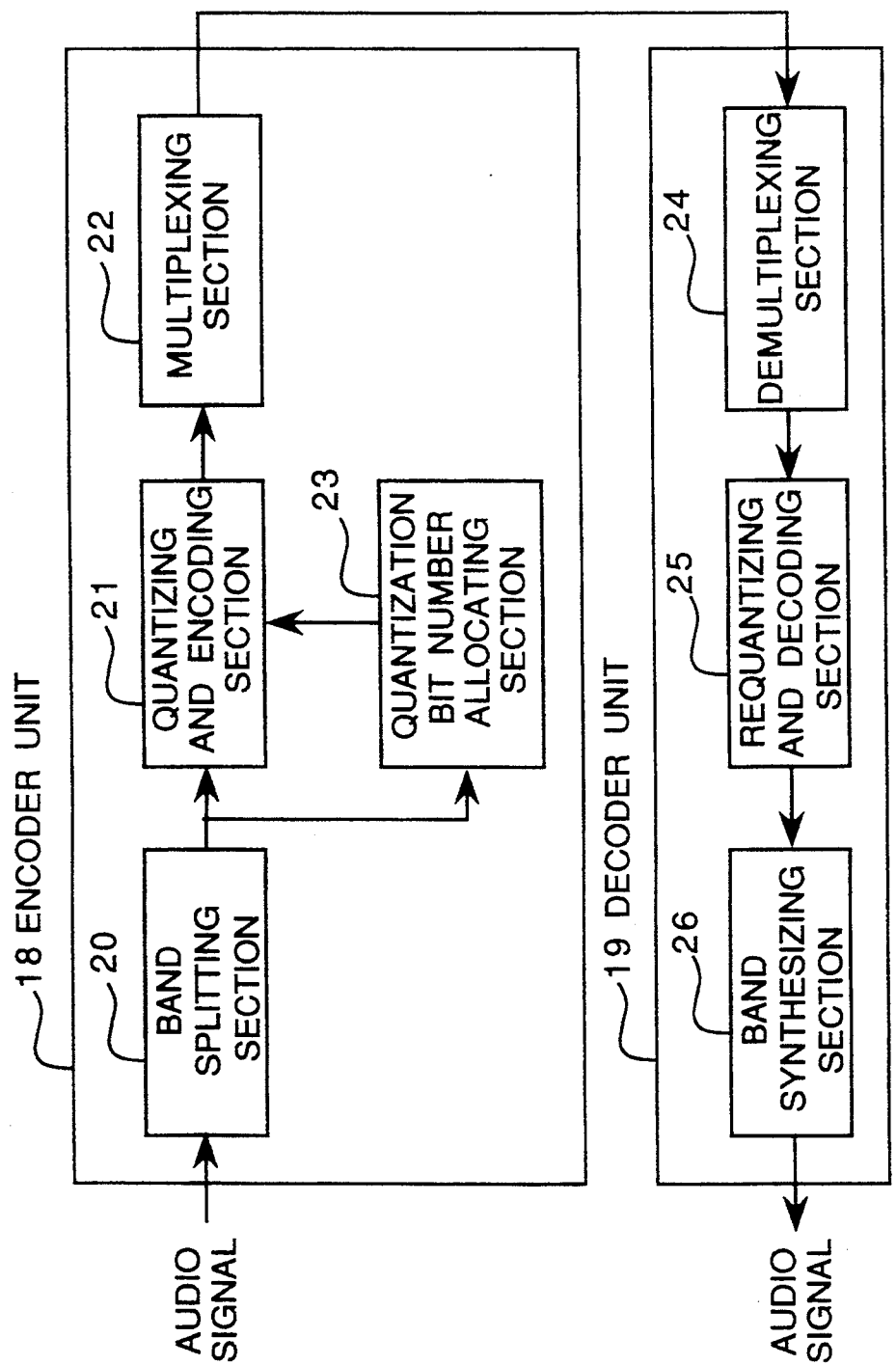

DIGITAL AUDIO SIGNAL CODING METHOD THROUGH ALLOCATION OF QUANTIZATION BITS TO SUB-BAND SAMPLES SPLIT FROM THE AUDIO SIGNAL

BACKGROUND OF THE INVENTION

1. Field of the Invention

The present invention relates to a digital audio signal coding system for coding music and sound signals through data compression and to a method therefor.

2. Description of the Prior Art

In a conventional audio signal coding system utilizing a band splitting method, the amount of quantization bit number has been so controlled that, a product of a down-sampling frequency and a quantization bit number, i.e., the amount of transmission data of each band conforms to the degree of contribution in the band in terms of articulation index (for example, refer to pages 56 through 61 of "High efficiency sound signal coding" written by Kazuo Nakata, published in 1986).

FIG. 5 shows a block diagram of a general audio signal encoding and decoding device. Referring to FIG. 5, designated by a reference numeral 18 is an encoder unit and numeral 19 is a decoder unit. The encoder unit 18 includes a band splitting section 20 for splitting an audio signal into a number of sub-bands, a quantizing and encoding section 21 for quantizing and encoding samples of each sub-band signal every specified amount of samples, a multiplexing section 22 for transmitting or recording each encoded sub-band signal, and a quantization bit number allocating section 23 for allocating a quantization bit number to every certain amount of samples of each sub-band signal when quantizing the samples. In the encoding stage, the bands have been split in such a way that each of the bands has the same degree of contribution in terms of articulation index, and the bit number has been allocated in such a manner that the product of a down sampling frequency and a quantization bit number allocated to every amount of samples, i.e., the amount of transmission data of each band conforms to the degree of articulation index contribution of the band.

On the other hand, the decoder unit 19 includes a demultiplexing section 24 for demultiplexing sub-band signals each transmitted or recorded in a multiplex form, a dequantizing and decoding section 25 for dequantizing and decoding the samples of the sub-band signals, and a band synthesizing section 26 for synthesizing the sub-band signals into a full-band audio signal.

According to such a conventional quantization bit control method in an audio signal coding device employing the conventional band splitting process described as above, the quantization bit number is controlled so that the amount of transmission data in each band conforms to the degree of contribution of the band in terms of articulation index. The above-mentioned method has been effective in efficiently coding data. However, in such a conventional way of quantization bit control, since whole data of auditory data such as music and sound recognized through human auditory sense is uniformly coded, such a conventional quantization bit control method is not satisfactory one for allocating more bits to data important for human sense, which means that the limited coding capacity is not used efficiently.

SUMMARY OF THE INVENTION

Accordingly, an essential object of the present invention is to provide a digital audio signal coding system and method for efficiently coding data which is important for human auditory sense in a limited coding capacity.

In order to achieve the object, the present invention provides a digital audio signal coding system for dividing a digital audio signal into a plurality of sub-band signals and controlling a quantization bit number to be given to each sample of the sub-band signals according to the human auditory characteristics thereby to code the sample of each sub-band signal, wherein the quantization bit number to be given to each sample of the sub-band signals is controlled depending on an index and a coding bit rate, wherein the index is obtained by weighting a logarithm value of a level of each sub-band signal in accordance with a weight corresponding to the level and a weight corresponding to a frequency allocated to each sub-band.

According to a feature of the present invention, by coding an input signal by means of the above-mentioned digital audio coding system, data important for human auditory sense can be efficiently coded within a limited coding capacity. Furthermore, since the quantization bit number is determined in accordance with the characteristics of each input digital audio signal at every prescribed time period, the audio signal coding system of the present invention is appropriately applied for any kind of input audio signals.

BRIEF DESCRIPTION OF THE DRAWINGS

These and other objects and features of the present invention will become apparent from the following description taken in conjunction with the preferred embodiment thereof with reference to the accompanying drawings, in which:

FIG. 5 is a block diagram showing a general audio signal encoding and decoding system.

DETAILED DESCRIPTION OF THE PREFERRED EMBODIMENTS

The following describes a preferred embodiment of a digital audio signal coding system of the present invention with reference to FIGS. 1 through 5.

Figure 1:
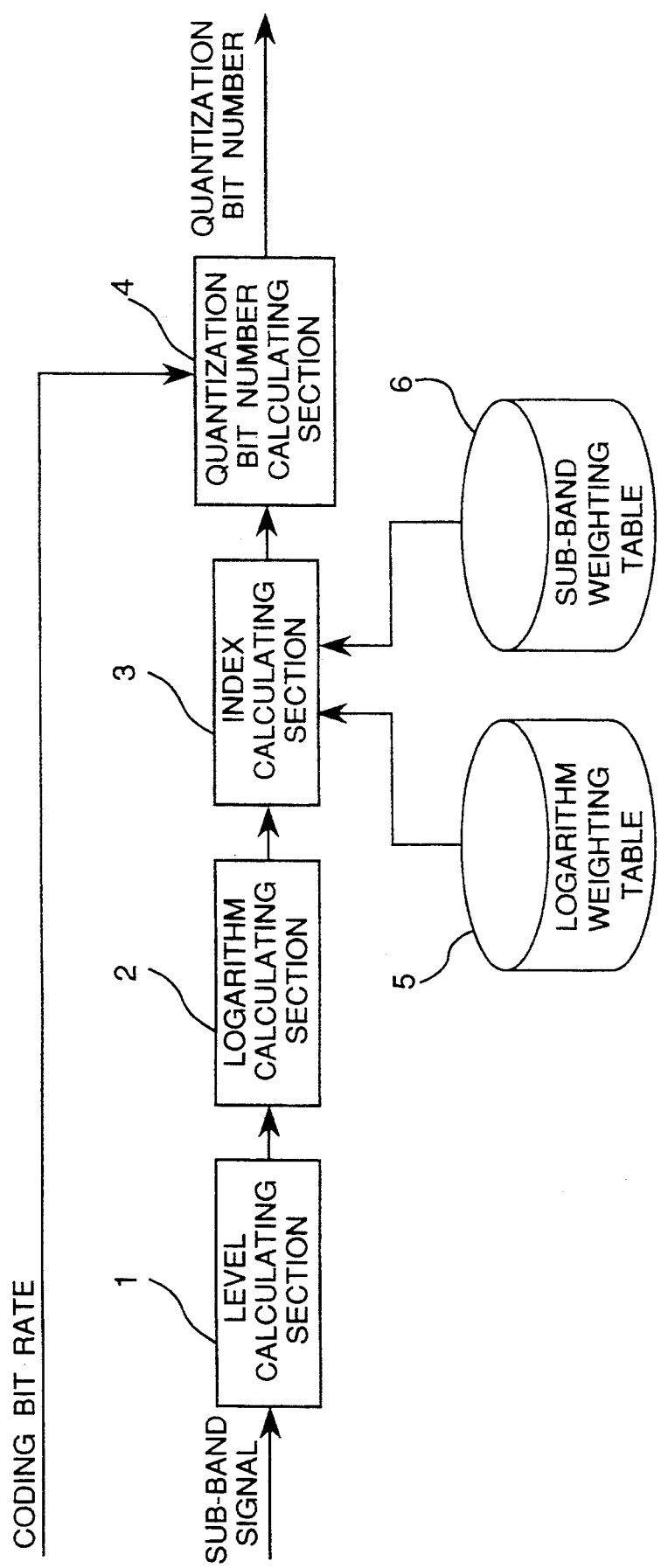
FIG. 1 is a block diagram of a quantization bit number allocating section of a digital audio signal coding system in accordance with an embodiment of the present invention.

Referring to FIG. 1, a quantization bit number allocating section (see section 23 of FIG. 5) includes a level calculating section 1, a logarithm calculating section 2, an index calculating section 3, a quantization bit number calculating section 4, a logarithm weighting table 5, and a sub-band weighting table 6.

The following describes the operation of the quantization bit number allocating section with reference to FIG. 1.

Firstly, when the level calculating section 1 receives a specified amount of samples of each of a number of sub-band signals obtained through splitting an input audio signal by a band splitting section (see section 20 of FIG. 5), a level of each sub-band signal is calculated by the level calculating section 1. The calculation of each sub-band level can be performed, for example, by obtaining a peak value of a specified amount of samples of each sub-band signal. Consequently, even when a sub-band signal has small energy in a prescribed time period, a high level is to be given to the sub-band signal so long as the sub-band signal contains a high-peak component which is important in sound quality. Therefore, a quantization bit number larger than that determined by the value of energy or other factors of the signal can be allocated to the sub-band.

Secondly, a logarithm value of each sub-band level is calculated through calculation in the logarithm calculating section 2. The following describes an effective embodiment of the calculation performed by the logarithm calculating section 2 with reference to FIG. 2.

Figure 2:
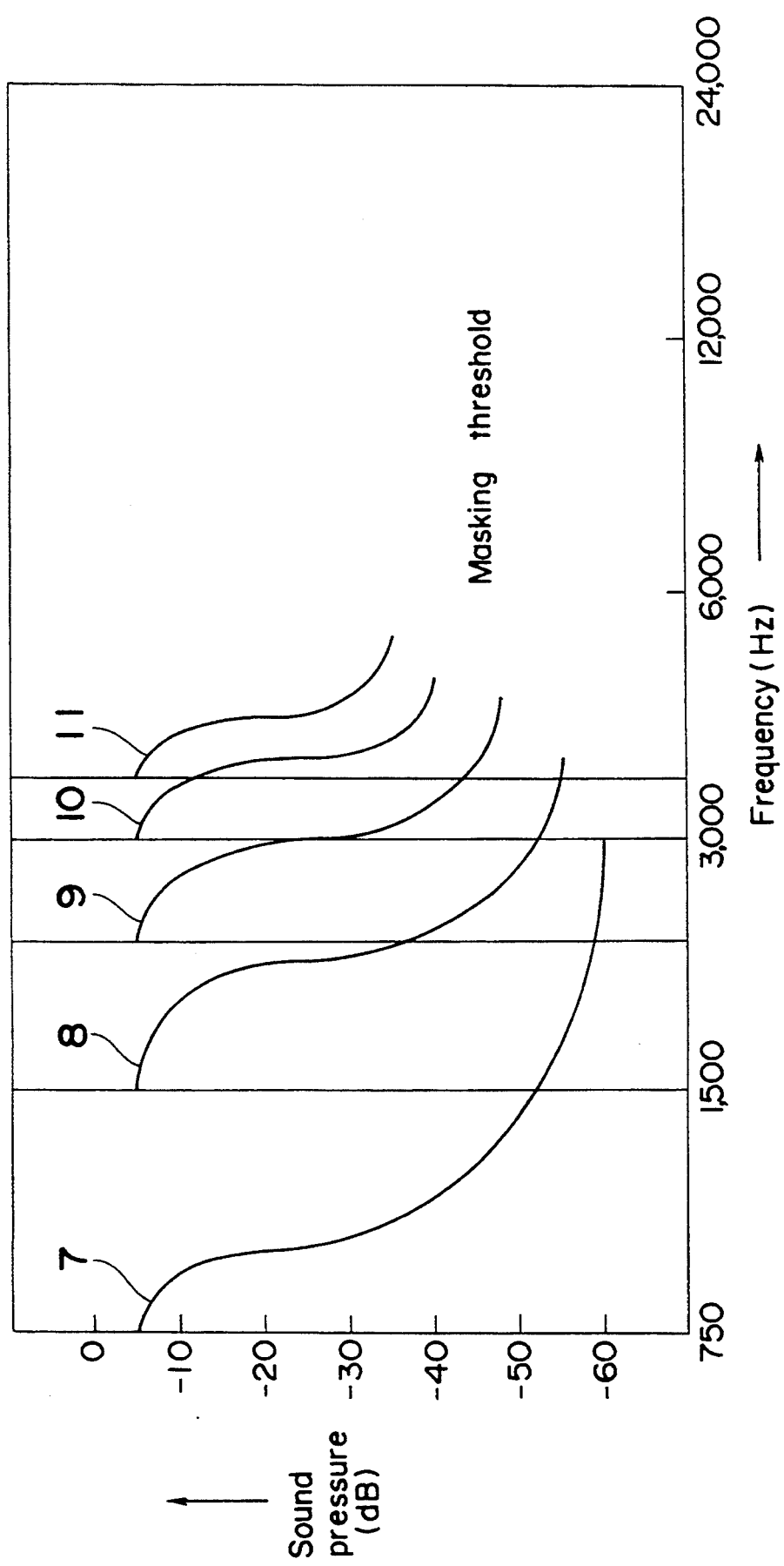
FIG. 2 is a graph of masking threshold characteristic curves.

FIG. 2 shows masking threshold characteristic curves to be exerted from one sub-band signal to the other sub-band signals when each of the sub-bands has a level of 0 dB. The term "masking" means that, one stimulus is acoustically masked by another stimulus and therefore the one stimulus (sound) to be applied to human auditory sense is virtually reduced in level (refer to page 111 of "Auditory sense and sound" supervised by Tanetoshi Miura, published in 1980). For example, a curve 7 represents a masking threshold exerted from a first sub-band signal having a band range of 0 to 750 Hz to a second sub-band signal having a band range of 750 to 1,500 Hz. In a similar manner, a curve 8 represents a masking threshold exerted from the second sub-band signal having a band range of 750 to 1,500 Hz to a third sub-band signal having a band range of 1,500 to 2,250 Hz. A curve 9 represents a masking threshold exerted from the third sub-band signal to a fourth sub-band signal. A curve 10 represents a masking threshold exerted from the fourth sub-band signal to a fifth sub-band signal. A curve 11 represents a masking threshold exerted from the fifth sub-band signal to a sixth sub-band signal. When a seventh sub-band or higher sub-band exists, a masking threshold can be given to each sub-band.

A masking threshold exerted from one sub-band signal to the other sub-band signal is calculated in accordance with the level of each sub-band signal based on the curves shown in FIG. 2. When one sub-band signal has a level lower than a level of a masking threshold exerted from another sub-band signal, the level of the one sub-band signal is set to zero. Consequently, the limited coding bits can be effectively allocated to other sub-band signals which are not masked and therefore more prominent to the human auditory sense.

Figure 3:
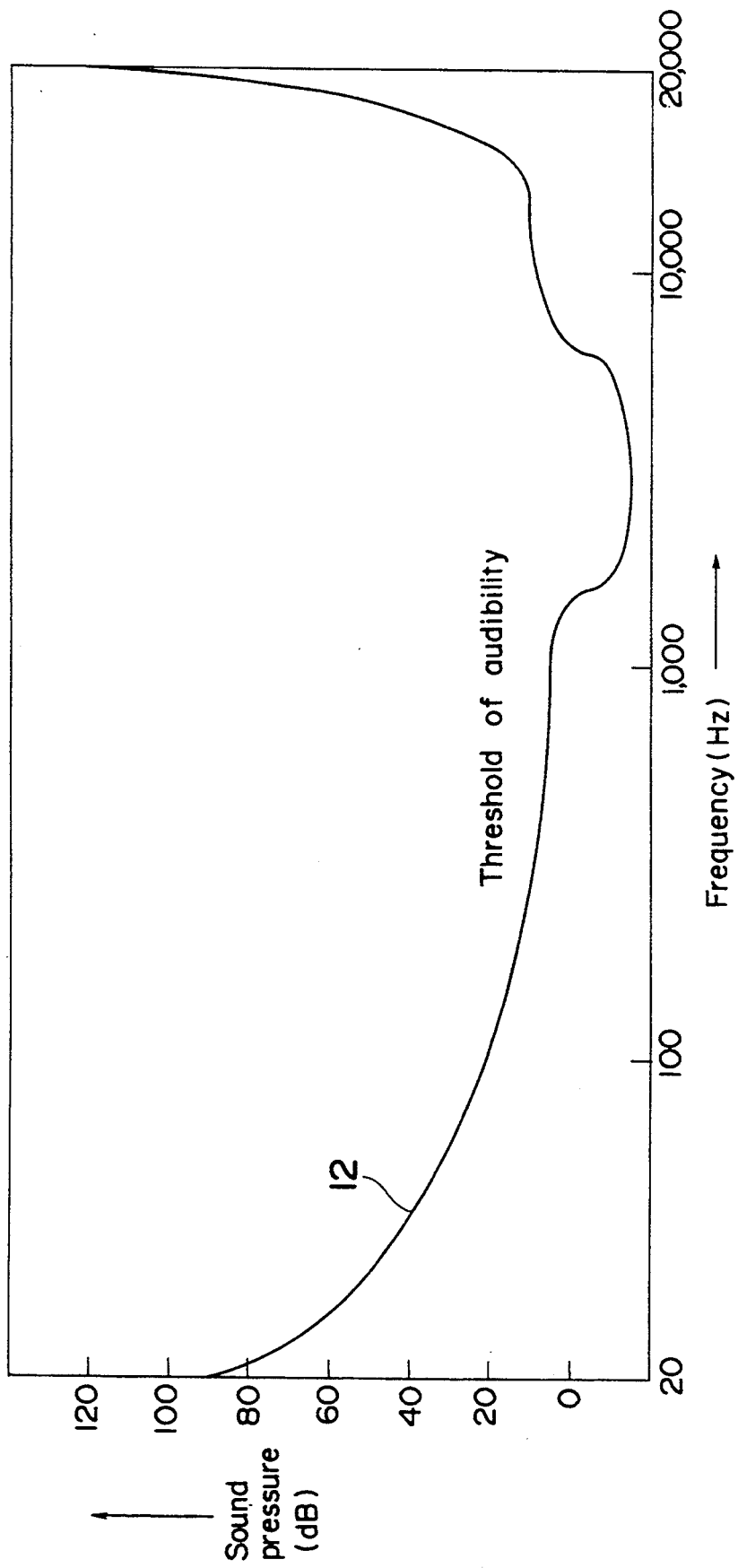
FIG. 3 is a graph of a threshold of audibility characteristic curve.

The following describes another effective embodiment of logarithm calculation performed by the logarithm calculating section 2 with reference to FIG. 3. FIG. 3 shows a threshold of audibility, where a reference numeral 12 indicates a threshold of audibility characteristic curve with the axis of abscissa representing the frequency and the axis of ordinate representing the sound pressure. It is reported by Fletcher and others that only people having a good hearing ability can hear a sound component having a sound pressure below the curve. Therefore, when a logarithm of a level given to each sub-band signal is smaller than the threshold of audibility within the range of the sub-band, the level of the sub-band signal is set to zero. Consequently, the limited coding bits can be effectively allocated to sub-bands having higher levels than the threshold of audibility.

Figure 4:
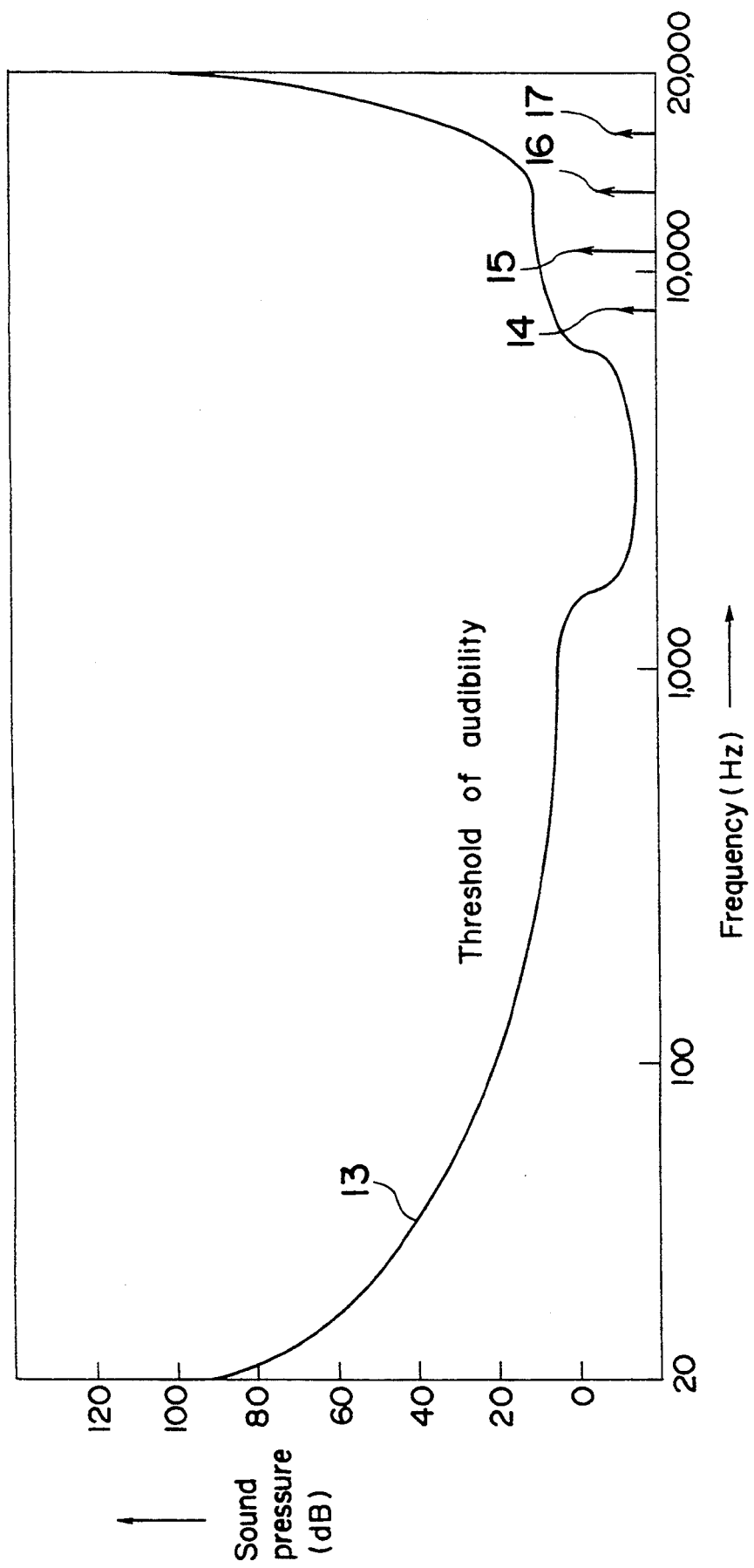
FIG. 4 is a graph of a threshold of audibility characteristic curve and peak level in each sub-band.

The following describes yet another effective embodiment of calculation performed by the logarithm calculating section 2 with reference to FIG. 4.

FIG. 4 shows a threshold of audibility and peak values of sub-bands, where reference numeral 13 indicates a threshold of audibility characteristic curve with the axis of abscissa representing the frequency and the axis of ordinate representing the sound pressure. Reference numerals 14, 15, 16, and 17 indicate peak values of the sub-bands. In the above-mentioned case, since the peak values of all the sub-bands are below the threshold of audibility, a quantization bit number having a number of zero can be given to each of all the sub-bands. However, the above-mentioned way cannot be considered best in terms of effectively using the limited coding bits. Therefore, for example, when peak values of all the sub-bands are below the threshold of audibility, quantization bits are given to continuous three sub-bands with the sub-band having the highest peak value centered. Since the peak value 15 is the highest peak value of all the sub-bands in the case shown FIG. 4, quantization bits are given to the sub-band having the peak value 15 and to the sub-bands (corresponding to the peak values 14 and 16) just adjacent to the highest sub-band 15. With the above-mentioned arrangement, the given coding bits are effectively used, and when measuring with a measuring instrument a low-level signal which cannot be detected by human auditory sense, an excellent characteristic results.

Thirdly, in the index calculating section 3, an index for calculating a quantization bit number to be given to each sub-band is calculated from the logarithm of the level of each sub-band obtained through the above logarithm calculating section 2. In this process, each index is calculated by referring to a logarithm weighting table 5 in which there are preregistered weighting values predetermined according to logarithm values and referring to a sub-band weighting table 6 in which there are preregistered weighting values predetermined for each sub-band. According to an exemplified way of index calculation, a logarithm corresponding to the level of a sub-band is multiplied by a weight corresponding to the logarithm and further multiplied by a weight determined for the sub-band thereby to obtain the index of the sub-band.

Table 1 is an exemplified sub-band weighting table in the case where 32 sub-bands exist.

TABLE 1

| Sub-band No. | Weight | Sub-band No. | Weight |
|---|---|---|---|
| 1 | 0.32 | 17 | 0.22 |
| 2 | | 18 | |
| 3 | | 19 | |
| 4 | | 20 | 0.18 |
| 5 | | 21 | |
| 6 | | 22 | |
| 7 | | 23 | 0.16 |
| 8 | | 24 | |
| 9 | | 25 | |
| 10 | 0.26 | 26 | 0.13 |
| 11 | 0.22 | 27 | |
| 12 | | 28 | |
| 13 | | 29 | 0.11 |
| 14 | | 30 | |
| 15 | | 31 | |
| 16 | | 32 | 0.10 |

It is also possible to derive the logarithm weighting table 5 and the sub-band weighting table 6 each time by means of formulas. For example, each logarithm can be weighted by being raised to a power thereof.

Lastly, a quantization bit number is given to each sub-band through calculation in the quantization bit number calculating section 4. The quantization bit number calculating section 4 calculates a quantization bit number to be given to a specified amount of samples of each sub-band signal depending on the index given to each sub-band obtained by the index calculating section 3 and depending on a prescribed coding bit rate permitted to the entire band for coding. The prescribed coding bit rate is previously stored in such as a table, which is considered as a sort of input signal to be specified by a input parameter or the like.

It is also possible that, when determining a quantization bit number for each sub-band in the quantization bit number calculating section 4, a quantization bit number to be given to each sub-band can be controlled based on a ratio of an index to be given to each sub-band to the sum of the indexes to be given to the objective sub-bands to which quantization bit numbers are to be allocated. In other words, assuming that an index of the objective i-th sub-band to which a quantization bit number is allocated is W(i); the sum S of the indexes of all the objective sub-bands to which the quantization bit numbers are allocated is obtained according to the equation:

$$S = \sum_{i} W(i)$$

where i represents the objective sub-bands to which quantization bit numbers are allocated; and then the quantization bit number of a sub-band j is controlled according to the formula:

$$w(j)/S$$

Thus, the resulting quantization bit numbers to be allocated to the objective sub-bands can be easily obtained based on each index value.

According to the present invention described as above, by virtue of the steps of determining a weight to be given to each sub-band with reference to a weighting table corresponding to the logarithm of the level and the frequency of each sub-band, and then obtaining an index for determining a quantization bit number to be given to each sub-band based on the weight to determine a quantization bit number while taking into account the level and the frequency of an audio signal both of which are important factors for the human auditory sense, a high-quality sound can be obtained.

In addition, since the present quantization bit allocating section used sample values of each sub-band signal obtained through splitting in the band splitting section and weight values preregistered in the weighting tables, an effective result can be obtained through an easy data processing.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A digital audio signal coding method for reducing the number of quantization bits allocated to each sample of each of a plurality of sub-band signals in order to code the samples, said method comprising the steps of:
   splitting a digital audio signal into said plurality of sub-band signals each being sampled and each having a specified frequency;
   calculating a level for each of said plurality of sub-band signals;
   calculating a logarithm value of the level of each sub-band signal;
   calculating an index by multiplying the logarithm value of the level by a weight which is dependent on the level and by weight which is dependent on the specified frequency allocated to each sub-band; and
   determining the number of quantization bits to be used for each sample according to the calculated index and a prescribed coding bit rate permitted to the entire band for coding the sub-band signals.

2. The method as claimed in claim 1, wherein a masking threshold level is applied from one sub-band signal to an adjacent sub-band signal, and when the level of the adjacent sub-band signal is lower than the masking threshold level applied from the one sub-band signal, the level of the adjacent sub-band signal is set to zero.

3. The method as claimed in claim 2, wherein, when the level of a sub-band signal is below a threshold of audibility of the sub-band, the level of the sub-band signal is set to zero.

4. The method as claimed in claim 2, wherein the level of each sub-band signal used for controlling the number of quantization bits allocated to each sub-band is determined according to a peak value in the sub-band in a prescribed time period.

5. The method as claimed in claim 1, wherein when the level of a sub-band signal is below a threshold of audibility of the sub-band, the level of the sub-band signal is set to zero.

6. The method as claimed in claim 5, wherein, even when the levels of all the sub-band signals are below the threshold of audibility, quantization bits are allocated to a plurality of continuous sub-bands including the sub-band having the highest level and the sub-bands adjacent to the sub-band with the highest level so to effectively use the prescribed coding bit rate.

7. The method as claimed in claim 6, wherein the level of each sub-band signal used for controlling the number of quantization bits allocated to each sub-band is determined according to a peak value in the sub-band in a prescribed time period.

8. The method as claimed in claim 5, wherein the level of each sub-band signal used for controlling the number of quantization bits allocated to each sub-band is determined according to a peak value in the sub-band in a prescribed time period.

9. A digital audio signal coding system comprising:
   splitting means for splitting a digital audio signal into a plurality of sub-band signals each being sampled and each having a specified frequency; and
   quantization bit number control means for controlling a number of quantization bits allocated to each sample of each of the sub-band signals in order to code the samples, wherein said quantization bit number control means further comprises:

level calculating means for obtaining the level for each sub-band signal;

logarithm calculating means for obtaining a logarithm of the level of each sub-band calculated by said level calculating means; and index calculating means for obtaining an index by multiplying the logarithm value of the level of each sub-band signal by a weight which is dependent on the level and by a weight which is dependent on the frequency specified to each sub-band, whereby the number of quantization bits allocated to each sample of the sub-band is determined using said index obtained by said index calculating means and using a prescribed coding bit rate permitted to the entire band for coding the sub-band signals.

10. A digital audio signal coding method for reducing the number of quantization bits allocated to each sample of each of a plurality of sub-band signals in order to code the samples, said method comprising the steps of:

splitting a digital audio signal into said plurality of sub-band signals each being sampled and each having a specified frequency;

calculating a level for each of said plurality of sub-band signals;

calculating a logarithm value of the level of each sub-band signal;

calculating an index by multiplying the logarithm value of the level by a weight which is dependent on the level and by a weight which is dependent on the specified frequency allocated to each sub-band; and determining the number of quantization bits to be used for each sample according to the calculated index and a prescribed coding bit rate permitted to the entire band for coding the sub-band signals, wherein the number of quantization bits allocated to each sub-band is controlled according to a ratio of an index of each sub-band to the sum of indexes of the plurality of sub-bands to which quantization bits are to be allocated.

11. The method as claimed in claim 10, wherein a masking threshold level is applied from one sub-band signal to an adjacent sub-band signal, and when the level of the adjacent sub-band signal is lower than the masking threshold level applied from the one sub-band signal, the level of the adjacent sub-band signal is set to zero.

12. The method as claimed in claim 10, wherein, when the level of a sub-band signal is below a threshold of audibility of the sub-band, the level of the sub-band signal is set to zero.

13. The method as claimed in claim 10, wherein the level of each sub-band signal used for controlling the number of quantization bits allocated to each sub-band is determined according to a peak value in the sub-band in a prescribed time period.

14. A digital audio signal coding method for reducing the number of quantization bits allocated to each sample of each of a plurality of sub-band signals in order to code the samples, said method comprising the steps of:

splitting a digital audio signal into said plurality of sub-band signals each being sampled and each having a specified frequency;

calculating a level according to a peak value for each of said plurality of sub-band signals;

calculating a logarithm value of the level value of each sub-band signal;

calculating an index by multiplying the logarithm value of the level by a weight which is dependent on the level and by a weight which is dependent on the specified frequency allocated to each sub-band; and determining the number of quantization bits to be used for each sample according to the calculated index and a prescribed coding bit rate permitted to the entire band for coding the sub-band signals.

* * * * *